US009036489B2

(12) United States Patent
Huseth et al.

(10) Patent No.: US 9,036,489 B2
(45) Date of Patent: May 19, 2015

(54) ACCESS POINT SYNCHRONIZATION IN WI-FI FIRE DETECTION SYSTEMS

(75) Inventors: Steve Huseth, Plymouth, MN (US);
Patrick Gonia, Maplewood, MN (US);
Andrew G. Berezowski, Wallingford, CT (US); Soumitri Kolavennu, Blaine, MN (US)

(73) Assignee: Honey International Inc., Morristown, NJ (US)

( * ) Notice: Subject to any disclaimer, the term of this patent is extended or adjusted under 35 U.S.C. 154(b) by 65 days.

(21) Appl. No.: 13/531,266

(22) Filed: Jun. 22, 2012

(65) Prior Publication Data
US 2013/0343202 A1    Dec. 26, 2013

(51) Int. Cl.
| G01R 31/08 | (2006.01) |
| H04W 4/00 | (2009.01) |
| G08B 17/00 | (2006.01) |
| G08B 25/00 | (2006.01) |
| G08B 25/10 | (2006.01) |
| G08B 29/18 | (2006.01) |
| H04W 52/02 | (2009.01) |
| H04W 4/22 | (2009.01) |

(52) U.S. Cl.
CPC .......... *H04W 52/0206* (2013.01); *G08B 17/00* (2013.01); *G08B 25/009* (2013.01); *G08B 25/10* (2013.01); *G08B 29/181* (2013.01); *H04W 4/22* (2013.01); *H04W 52/0216* (2013.01); *H04W 52/0296* (2013.01); *Y02B 60/50* (2013.01)

(58) Field of Classification Search
USPC ................................................. 370/244, 338
See application file for complete search history.

(56) References Cited

U.S. PATENT DOCUMENTS

| 7,522,934 | B2 * | 4/2009 | Fukuda ......................... 455/522 |
| 8,164,436 | B2 * | 4/2012 | Baird et al. ................... 340/506 |
| 2003/0152041 | A1 * | 8/2003 | Herrmann et al. ............. 370/310 |
| 2005/0020322 | A1 * | 1/2005 | Ruuska et al. ................ 455/574 |
| 2007/0147332 | A1 * | 6/2007 | Lappetelainen et al. ...... 370/346 |
| 2010/0177684 | A1 * | 7/2010 | Kore et al. .................... 370/328 |
| 2010/0271217 | A1 * | 10/2010 | Kates ............................ 340/604 |
| 2012/0269199 | A1 * | 10/2012 | Chan et al. .................... 370/401 |

OTHER PUBLICATIONS

IEEE Standard for Information technology—Telecommunications and information exchange between systems Local and metropolitan area networks—Specific requirements Part 11: Wireless LAN Medium Access Control (MAC) and Physical Layer (PHY) Specifications; Mar. 29, 2012, pp. 1-2793.*

* cited by examiner

*Primary Examiner* — Omar Ghowrwal
*Assistant Examiner* — Angel Brockman
(74) *Attorney, Agent, or Firm* — Husch Blackwell LLP

(57) ABSTRACT

Systems and methods of backup battery support for switches and access points in fire detection systems are provided. Methods can include identifying a communications time interval for a plurality of devices, detecting a power failure, identifying a start time for a next scheduled communications time interval for a respective one of the plurality of devices, placing a wireless access point in a low power mode, and, substantially immediately prior to the start time, removing the wireless access point from the low power mode.

20 Claims, 4 Drawing Sheets

US 9,036,489 B2

ACCESS POINT SYNCHRONIZATION IN WI-FI FIRE DETECTION SYSTEMS

FIELD

The present invention relates generally to fire detection systems. More particularly, the present invention relates to access point synchronization in Wi-Fi fire detection systems.

BACKGROUND

Many fire control systems use wireless technology to connect the various devices of the system, and the use of such wireless technology provides many advantages. First, installation costs can be reduced when wireless technology is employed in fire control systems. For example, wires need not be pulled through ceilings and walls as is required in a wired installation.

Second, sensors and appliances in the fire control system can be placed in the most appropriate places in a building rather than in places where wires can be most easily placed. This advantage is especially critical in structures that are difficult to wire, such as historic buildings, hospitals, and buildings with heavy walls.

Finally, devices in the fire control system that employ wireless technology can be automatically configured. Further, the devices can use various methods of wireless localization to establish their own unique identifier based on their placement in a building.

Despite the many advantages of fire control systems that employ wireless technology, including those described above, wireless fire systems are often perceived to be less reliable than wired systems. This is true even though fire control systems that employ wired technology carry the risk of the wires becoming damaged or cut. Thus, careful attention must be paid to the robustness and reliability of wireless fire systems.

Many solutions have been proposed to wirelessly connect sensors in fire control systems. For example, many proposed solutions have used proprietary radios and protocols to connect a fire control panel or wired gateway to sensors in the fire control system. However, these solutions often require mounting and connecting access points as well as maintaining a proprietary radio network that supports the fire system.

With the broad acceptance of IEEE 802.11 Wi-Fi networks, existing wireless infrastructures can be used to relay signals in fire detection systems from the sensors and pull stations to a fire panel and from the fire panel to actuation and enunciator devices. However, a critical element of a Wi-Fi infrastructure is the battery backup support of all switches and access points used by the fire detection system. Large rechargeable batteries can be used, but at a considerable expense.

Accordingly, there is a continuing, ongoing need for improved backup battery support for switches and access points in fire detection systems.

DETAILED DESCRIPTION

Figure 1:
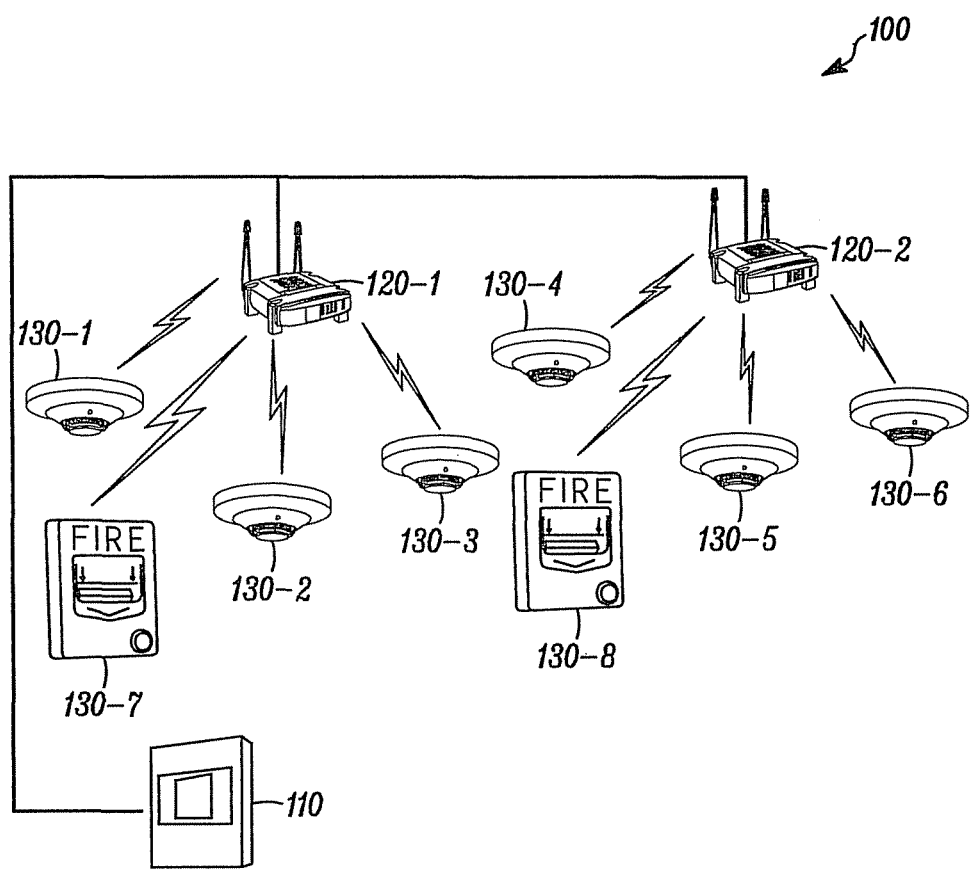
FIG. 1 is a system in accordance with embodiments disclosed herein.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include improved backup battery support for switches and access points in fire detection systems. For example, during a power failure, an access point in accordance with disclosed embodiments can handle only messages from fire system appliances. That is, during the power failure, the access point can ignore messages from appliances that are not part of the fire system or ignore messages that are non-essential to the fire system.

Systems in accordance with disclosed embodiments can include at least one wireless access point and at least one sensor that communicate via a Wi-Fi IEEE 802.11a/b/g/n network. The access point can wirelessly receive messages from the sensor and transmit messages to a control panel via a hardwired Ethernet connection.

Sensors in the system can transmit alarm or status messages on a periodic, predefined schedule. That is, the sensors can transmit and receive messages at precise time intervals or every N seconds. In accordance with disclosed embodiments, each access point associated with a sensor can record the transmission and reception schedule for that sensor, that is, the communications schedule for that sensor. Accordingly, an access point can record the communications schedules for all of the sensors associated therewith.

During normal operation, an access point can identify sensors or other fire control system appliances that are associated with the access point and that are designed to transmit and receive alarm and status messages on a predefined, periodic schedule. The access point can then monitor each of the identified sensors as well as their associated communications schedules.

During a power failure event, an access point can enter a low or reduced power mode. Then, the access point can wake up or exit the low power mode prior to a scheduled communications time interval for a sensor associated therewith, and return to the low power mode after a communications time interval for a sensor associated therewith. In this manner, the power requirement for the access point and the cost and size of the backup battery can be significantly reduced.

For example, during the power failure event, the access point can enter a low power sleep mode and cease processing messages from devices that are not part of the fire detection system. However, before entering the low power sleep mode, the access point can set an internal timer or clock to wake up the access point just prior to the transmission of a message from a sensor, that is, just prior to a scheduled communications time interval for a sensor associated with the access point.

When woken up, that is, when in a full power mode, the wireless access point can receive a message from a sensor. After receiving the message from a sensor, the access point can forward the message as it would in a normal operation mode, set the timer for the next message to be received, and return to the low power sleep mode. Thus, in accordance with disclosed embodiments, during a power failure, an access point can operate in a full power mode only during an associated sensors' scheduled communications time interval. In this manner, the amount of backup battery used can be reduced.

FIG. 1 is a system 100 in accordance with embodiments disclosed herein. As seen in FIG. 1, the system 100 can include a control panel 110, a plurality of wireless access points 120-1, 120-2, and a plurality of sensors 130-1, 130-2, 130-3, 130-4, 130-5, 130-6 and actuators 130-7, 130-8. In some embodiments, each of the sensors 130-1, 130-2, 130-3, 130-4, 130-5, 130-6 and actuators 130-7, 130-8 can be battery powered and require no external wiring or power source.

As seen in FIG. 1, some of the sensors and actuators can wirelessly communicate with one of the access points, and some of the sensors and actuators can wirelessly communicate with the other access point. For example, sensors 130-1, 130-2, 130-3 and actuator 130-7 can wirelessly communicate with access point 120-1, and sensors 130-4, 130-5, 130-6 and actuator 130-8 can wirelessly communicate with access point 120-2. In some embodiments, each of the sensors 130-1, 130-2, 130-3, 130-4, 130-5, 130-6 and actuators 130-7, 130-8 can wirelessly communicate with the respective access point 120-1 or 120-2 via an IEEE 802.11a/b/g/n network. The access points 120-1, 120-2 can communicate with the control panel 110 via a hardwired Ethernet connection.

Figure 1A:
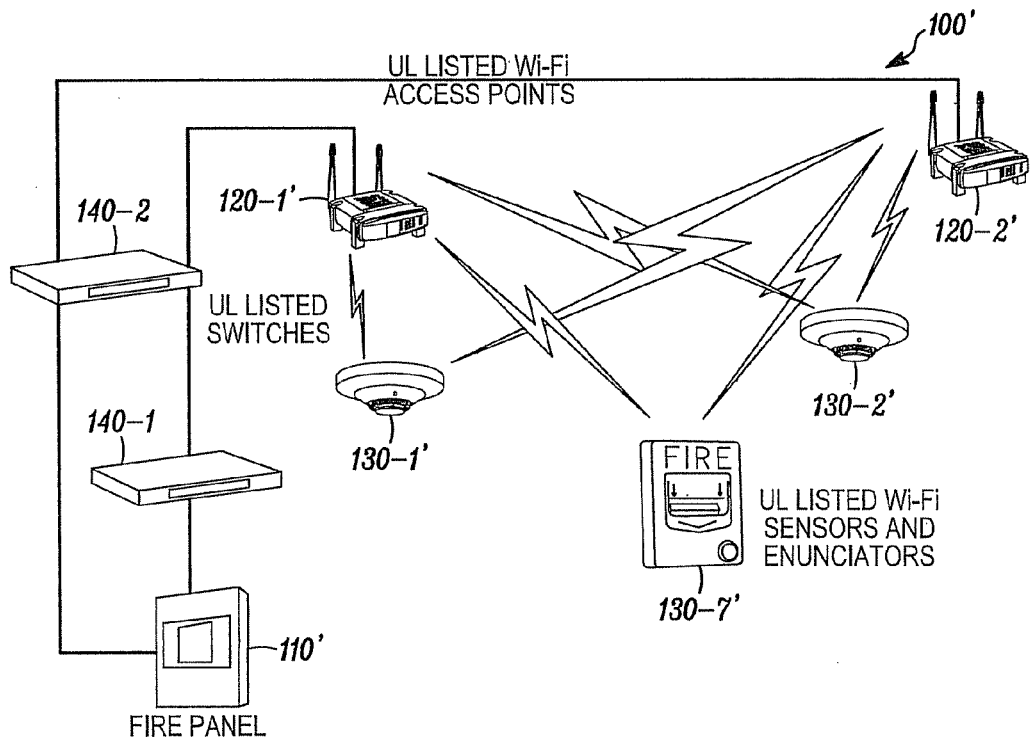
FIG. 1A is an alternate embodiment of a system in accordance with embodiments disclosed herein.

In some embodiments, each of the sensors and actuators can wirelessly communicate with more than one access point for redundancy. For example, as seen in FIG. 1A, each of the sensors 130-1', 130-2' and actuator 130-7' can wirelessly communicate with both access point 120-1' and access point 120-2'. When the system 100' includes more than two access points, some embodiments may include the sensors and actuators communicating with two of the access points, and some embodiments may include the sensors and actuators communicating with more than two of the access points. As seen in FIG. 1A, when each of the sensors 130-1', 130-2' and actuator 130-7' communicate with more than one access point 120-1' and 120-2', each of the access points 120-1', 120-2' can be routed to a control panel 110' through a respective switch 140-1, 140-2.

Figure 1B:
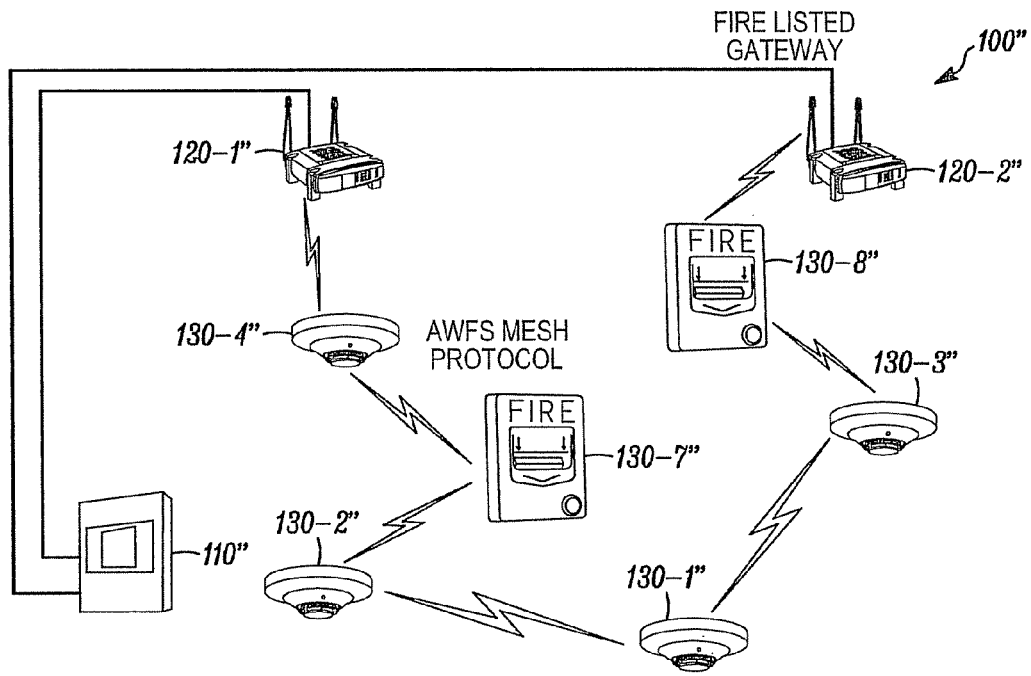
FIG. 1B is a second alternate embodiment of a system in accordance with embodiments disclosed herein.

In still other embodiments, each of the sensors and actuators can wirelessly communicate with two parent devices and/or two child devices to ensure dual redundant connectivity. For example, as seen in FIG. 1B, a sensor, for example, sensor 130-1", can communicate with two other sensors, for example, sensors 130-2" and 130-3". Then, sensors 130-2" and 130-3" can be assigned as primary and/or secondary parent devices to sensor 130-1". Embodiments as shown in FIG. 1B are preferable when a sensor or actuator cannot directly reach an access point in accordance with disclosed embodiments because the sensor or actuator has a wireless range that may be limited.

Figure 2:
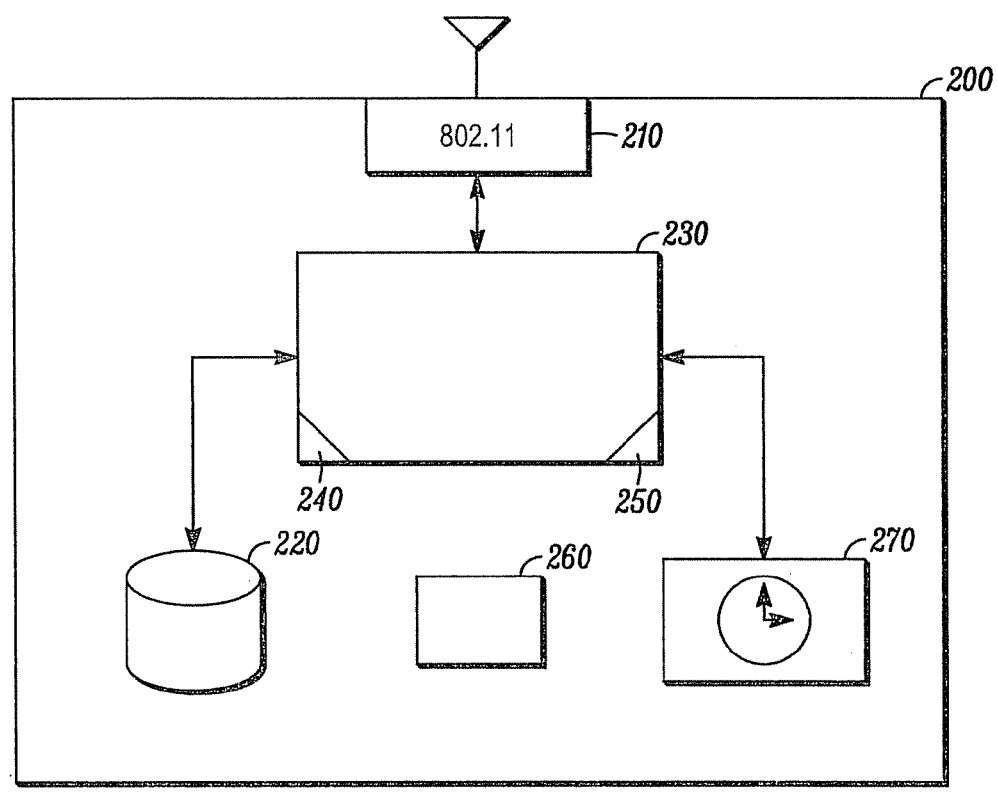
FIG. 2 is a block diagram of a wireless access point in accordance with embodiments disclosed herein.

FIG. 2 is a block diagram of a wireless access point 200 in accordance with embodiments disclosed herein. As seen in FIG. 2, the access point 200 can include a transceiver 210, for example, an IEEE 802.11 compatible radio, a memory device 220, a clock or timer 270, control circuitry 230, one or more programmable processors 240, executable control software 250, and a backup battery 260. The executable control software 250 can be stored on a transitory or non-transitory computer readable medium, including but not limited to, computer memory, RAM, optical storage media, magnetic storage media, flash memory, and the like.

In some embodiments, a plurality of sensors, actuators, or other devices can be registered with the access point 200. For example, the access point 200, via the transceiver 210, can communicate with each of the sensors and receive information related to the sensors' scheduled communications time periods. Then, the access point 200 can save that information in the memory device 220.

During a power failure, the access point 200 can receive power from the backup battery 260. The control circuitry 230, programmable processor 240, and executable control software 250 can access the memory device 220 to determine the next scheduled communications time period for a sensor or other device associated therewith. Then, the control circuitry 230, programmable processor 240, and executable control software 250 can set the timer 270 for a start time of the next scheduled communications time period or for a time substantially immediately prior to the start time of the next scheduled communications time period.

In some embodiments, after the timer 270 has been set, the access point 200, including the radio 210 and/or programmable processor 240, can enter a low power mode. While in the low power mode, the access point 200 can use less power from the backup battery 260 than it would if not in the low power mode, thus extending the life of the battery 260.

When the timer 270 indicates the time for which it was set, that is, when the timer 270 indicates that the next scheduled communications time period is about to occur, the access point 210, including the radio 210 and/or the programmable processor 240, can exit the low power mode and return to a full power mode. Then, the access point, via the transceiver 210, can receive a message from a sensor and transmit a time stamped acknowledgement message to the sensor. After transmitting the acknowledgement message, the access point 200 can again determine the next scheduled communications time period, set the timer 270, and return to the low power mode.

Figure 3:
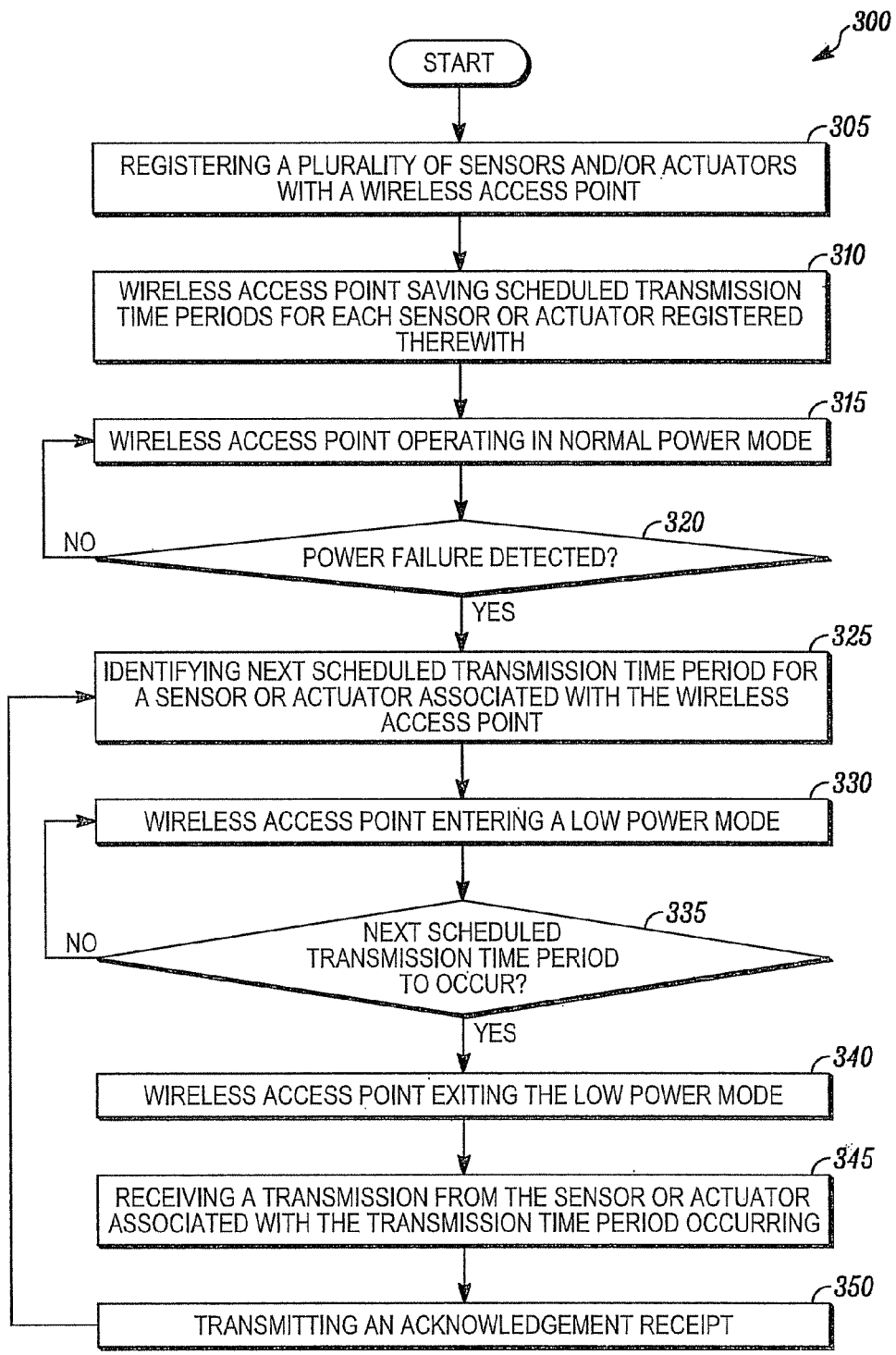
FIG. 3 is a flow diagram of a method in accordance with embodiments disclosed herein.

FIG. 3 is a flow diagram of a method 300 in accordance with embodiments disclosed herein. As seen in FIG. 3, the method 300 can include registering a plurality of sensors, actuators, or other devices with a wireless access point as in 305. Then, the wireless access point can save scheduled communications time periods for each sensor, actuator, or other device registered therewith as in 310.

The method 300 can include the wireless access point operating in a normal power mode as in 315. However, if and when a power failure is detected as in 320, additional steps can be executed.

For example, after a power failure is detected as in 320, the method 300 can include identifying the next scheduled communications time period for a sensor, actuator, or other device associated with the wireless access point as in 325. Then, the wireless access point can enter a low power mode as in 330.

If and when, the method determines that the next scheduled communications time period is about to occur as in 335, the wireless access point can exit the low power mode as in 340. For example, the wireless access point can exit the low power mode substantially immediately prior to the start time of the next scheduled communications time period. Then, the wireless access point can receive a transmission, for example, an alarm or status message, from the sensor, actuator, or other device associated with the communications time period that is occurring as in 345.

After receiving the transmission, the wireless access point can transmit an acknowledgement receipt to the sensor, actuator, or other device associated with the communications time period that is occurring as in 350. Then, the method 300 can identify the next scheduled communications time period as in 325 and reenter the low power mode as in 330.

In some embodiments, the wireless access point may not successfully receive a transmission from a sensor, actuator, or other device during that device's scheduled communications time period. In these embodiments, the method 300 can include determining an end time of the scheduled communications time period and reentering the low power mode substantially immediately after the end time of the scheduled communications time period.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the sprit and scope of the invention.

What is claimed is:

1. A method comprising: a wireless access point wirelessly communicating with a plurality of devices that are part of a fire system and at least one appliance that is not part of the fire system; the wireless access point identifying a communications time interval for the plurality of devices of the fire system; the wireless access point detecting a power failure; the wireless access point identifying a start time for a next scheduled communications time interval for a respective one of the plurality of devices; a processor of the wireless access point placing the wireless access point in a low power mode; and prior to the start time, a processor of the wireless access point removing the wireless access point from the low power mode, wherein during power failure, the wireless access point only handles messages from devices of the fire system and ignores messages from the at least one appliance that are is not part of the fire system.

2. The method of claim 1 further comprising, after removing the wireless access point from the low power mode, receiving a status or alarm message from the respective one of the plurality of devices.

3. The method of claim 2 further comprising, after receiving the status or alarm message, transmitting an acknowledgement message to the respective one of the plurality of devices.

4. The method of claim 3 further comprising, after transmitting the acknowledgement message, replacing the wireless access point in the low power mode.

5. The method of claim 1 further comprising: identifying an end time for the next scheduled communications time interval for the respective one of the plurality of devices; and after the end time, replacing the wireless access point in the low power mode.

6. The method of claim 1 further comprising ignoring a message received outside of the next scheduled communications time interval or ignoring a non-essential message received within the next scheduled communications time interval.

7. The method of claim 1 wherein placing the wireless access point in the low power mode includes using less power from a backup battery than used when removed from the low power mode.

8. A wireless access point comprising: a transceiver that wirelessly communicates with a plurality of devices of a fire system and at least one appliance that is not part of the fire system; control circuitry; a programmable processor; and executable control software stored on a non-transitory computer readable medium for:

identifying a communications time interval for the plurality of devices of the fire system associated with the transceiver; detecting a power failure; identifying a start time for a next scheduled communications time interval for a respective one of the plurality of devices;

placing at least one of the transceiver and the programmable processor in a low power mode; and substantially immediately prior to the start time, removing the at least one of the transceiver and the programmable processor from the low power mode, wherein during power failure, the transceiver only handles messages from fire system devices and ignores messages from the at least one appliance that are is not part of the fire system.

9. The wireless access point of claim 8 wherein the transceiver includes an 802.11 radio adapted to communication compliant with an IEEE 802.11 standard.

10. The wireless access point of claim 8 further comprising a backup battery for providing power to the transceiver and the programmable processor during the power failure.

11. The wireless access point of claim 8 wherein, after removing the at least one of the transceiver and the programmable processor from the low power mode, the transceiver receives a status or alarm message from the respective one of the plurality of devices.

12. The wireless access point of claim 11 wherein, after the transceiver receives the status or alarm message, the transceiver transmits an acknowledgement message to the respective one of the plurality of devices.

13. The wireless access point of claim 12 further comprising executable control software stored on the non-transitory computer readable medium for replacing the wireless access point in the low power mode after the transceiver transmits the acknowledgement message.

14. The wireless access point of claim 8 further comprising executable control software stored on the non-transitory computer readable medium for identifying an end time for the next scheduled transmission time interval for the respective one of the plurality of devices and for replacing the wireless access point in the low power mode substantially immediately after the end time.

15. A system comprising: at least one wireless access point that communicates with a plurality of devices of a fire system and at least one appliance that is not part of the fire system; and at least one monitoring device of the plurality of devices of the fire system that wirelessly communicates with a control panel of the fire system through the at least one wireless access point, wherein the at least one wireless access point stores information related to scheduled communications time intervals for the at least one monitoring device; wherein, when the at least one wireless access point detects a power failure, the at least one wireless access point identifies a start time for a next scheduled communications time interval and enters a low power mode, and wherein, prior to the start time, the at least one wireless access point exits the low power mode, wherein during power failure, the wireless access point only handles messages from monitoring devices of the fire system and ignores messages from the at least one appliance that are is not part of the fire system.

16. The system of claim 15 wherein, after exiting the low power mode, the at least one access point receives an alarm or status message from the at least one monitoring device, wherein, after receiving the alarm or status message, the at least one access point transmits an acknowledgement message to the at least one monitoring device, and wherein, after transmitting the acknowledgement message, the at least one access point reenters the low power mode.

17. The system of claim 15 wherein the at least one access point identifies an end time for the next scheduled transmission communications time interval and reenters the low power mode substantially immediately after the end time for the next scheduled transmission time interval.

18. The method of claim 1 wherein at least one of the plurality of devices is capable of detecting the presence of a fire.

19. The system of claim 15 further comprising at least two wireless access points, wherein each of the at least two wireless access points stores information related to the scheduled communications time intervals for the at least one monitoring device, wherein, when each of the at least two wireless access points detects the power failure, each of the at least two wireless access points identifies the start time for the next scheduled communications time interval and enters the low power mode, and wherein, prior to the start time of the next scheduled communications time interval, each of the at least two wireless access points exits the low power mode.

20. The system of claim 15 further comprising at least two monitoring devices, wherein a first of the at least two monitoring devices functions as a parent to a second of the at least two monitoring devices, wherein the first of the at least two monitoring devices stores information related to scheduled communications time intervals for the second of the at least two monitoring devices, wherein, when each of the at least two monitoring devices detects the power failure, each of the at least two monitoring devices identifies a start time for the next scheduled communications time interval for the second of the at least two monitoring devices and enters the low power mode, and wherein, prior to the start time, each of the at least two monitoring devices exits the low power mode.

* * * * *